United States Patent
He

(10) Patent No.: US 8,608,364 B1
(45) Date of Patent: Dec. 17, 2013

(54) BACKLIGHT MODULE FOR 3D DISPLAYING AND LED LIGHT BAR THEREOF

(75) Inventor: Hu He, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 0 days.

(21) Appl. No.: 13/579,281

(22) PCT Filed: Jun. 28, 2012

(86) PCT No.: PCT/CN2012/077808
§ 371 (c)(1),
(2), (4) Date: Aug. 15, 2012

(30) Foreign Application Priority Data

Jun. 14, 2012 (CN) .......................... 2012 1 0196557

(51) Int. Cl.
*F21V 7/04* (2006.01)
(52) U.S. Cl.
USPC .............................. 362/612; 349/15; 345/419
(58) Field of Classification Search
USPC .............................. 362/612; 349/15; 345/419
See application file for complete search history.

(56) References Cited

U.S. PATENT DOCUMENTS

| 7,911,547 | B2* | 3/2011 | Brott et al. | 349/15 |
| 8,059,217 | B2* | 11/2011 | Brott et al. | 349/15 |
| 2008/0084512 | A1* | 4/2008 | Brott et al. | 349/15 |
| 2008/0084513 | A1* | 4/2008 | Brott et al. | 349/15 |
| 2011/0134347 | A1* | 6/2011 | Brott et al. | 349/15 |

* cited by examiner

*Primary Examiner* — Mary Ellen Bowman
(74) *Attorney, Agent, or Firm* — Cheng-Ju Chiang

(57) ABSTRACT

The present invention relates to a backlight module for 3D displaying and an LED light bar thereof. The backlight module for 3D displaying includes a light guide plate and at least one LED light bar. The LED light bar is arranged at one edge of the light guide plate. The LED light bar includes a plurality of LEDs and a substrate. The LEDs are arranged in a line and are mounted to the substrate in a mutually spaced manner. The LEDs and the substrate of the LED light bar are arranged in a plurality of sections to correspond to a predetermined backlight scanning arrangement. LED spacing set in each of the sections is less than LED spacing set between the section and an adjacent section. The present invention also provides an LED light bar of backlight module for 3D displaying.

11 Claims, 5 Drawing Sheets

BACKLIGHT MODULE FOR 3D DISPLAYING AND LED LIGHT BAR THEREOF

BACKGROUND OF THE INVENTION

1. Field of the Invention

The present invention relates to liquid crystal displaying techniques, and in particular to a backlight module for 3D displaying and an LED (Light-Emitting Diode) light bar.

2. The Related Arts

With the progress of 3D technology, television having 3D displaying function is now becoming the main stream. The commonly known 3D displaying modes include shutter glass and film-type patterned retarder (FPR).

The shutter glass 3D displaying is effected with scanning backlight in combination with panel pixel scanning. Backlighting is often sectionalized so that a side-edge LED light bar is divided into multiple sections. When a first frame signal of a panel is applied to scan the first section, the LEDs of the first section are lit, while the remaining is set off. When the panel signal scans the second section, only the LEDs of the second section are lit. This is also applied to the other sections. Such an operation is carried out for each frame. The performance of the shutter glass 3D displaying is assessed according to cross-talking among sections. The lower the cross-talking is, the better the displaying result will be. Cross-talking is generally determined according to cross talk among the backlight sections and design of timing sequence.

Cross-talking among backlight sections generally comes from the influence of brightness among different sections and the best situation is that when one section is lit, the backlighting of all the remaining sections shows darkness. As shown in FIG. 1, a side elevational view of a conventional light guide plate with upper microstructures is illustrated. Forming serrated microstructures on the upper or lower surface of a light guide plate is a commonly known design. FIG. 1 is made for observation of light guide plate 10 from the side where light gets incident. The upper surface of the light guide plate 10 forms upper microstructures 11 distributed on the upper surface of the light guide plate 10 in a successive raising-recessing-alternating arrangement in a direction perpendicular to the propagation direction of light in the light guide plate 10, whereby the geometric variation on the upper surface of the light guide plate is useful to eliminate the conditions for occurrence of total reflection. As shown in FIG. 2, a schematic view illustrating difference of light shape between a conventional flat light guide plate and a light guide plate with upper microstructures is given. Although FIG. 2 illustrates that the light shape of the light guide plate 20 with upper microstructures shows a more confined light shape than a flat light guide plate 21, yet actually, even though light in the light guide plate 20 with upper microstructures is partially confined, it gets diverging to some extents.

With the increase of the propagation distance, the divergence of the light shape gets greater and imposes severer influence on other sections. As shown in FIG. 3, a schematic view showing the distribution of light field of a well known upper-microstructured light guide plate 30 for the condition of one section being lit is given. When one section of the upper-microstructured light guide plate 30 is lit, the light shape is getting divergent with distance. Referring to FIG. 4, which is a schematic view showing the distribution of brightness in a vertical direction for the light shape shown in FIG. 3, the brightness distribution in the vertical direction can be indicated by full width at half maximum (FWHM), left hand side being the light incidence side. Referring to FIG. 5, which is a schematic view showing the variation of the width for half brightness at different locations with respect to the distance, in single short edge light incidence, FWHM shows a trend of getting wider with the increase of distance. In other words, for single short edge light incidence, the remote side shows severer cross-talking than the light incidence side.

Referring to FIG. 6, a schematic view showing the structure of a conventional side-edge LED light bar is given. The LED light bar 60 shown in FIG. 6 is divided into two sections 63, 64. The distribution of LEDs 61 on the conventional side-edge LED light bar 60 is not arranged in any specific design according to the sections. It is often that the LEDs 61 are set at a fixed pitch 62.

An LED light bar with such an arrangement shows severe cross-talking between different sections when applied to backlight modules of singe short edge incidence or dual short edge incidence. As shown in FIGS. 7 and 8, which are schematic views showing overlapping of backlighting light fields in backlight modules of singe short edge incidence and dual short edge incidence, in which overlapping of the backlighting light fields of four sections is shown. FIG. 7 is associated with the backlight module of singe short edge incidence, in which an LED light bar 71 is set at a short edge of a light guide plate 70. FIG. 8 is associated with the backlight module of dual short edge incidence, in which LED light bars 81, 82 are respectively set at two opposite short edges of a light guide plate 80. In FIGS. 7 and 8, the light field distributions of different sections of the light bar are respectively indicated by dot-dash line, dash line, and solid line for distinction. The crossing portion between light fields of different sections is shown great, which means cross-talking is severe. The light bars in FIGS. 7 and 8 are both divided into four light bar sections, in which sections 1-4 represent four sections and are respectively indicated by a dot-dash line, a dash line, a solid line, and a dot-dash line. These different types of line (namely the dot-dash line, the dash line, the solid line, and the dot-dash line) in the drawings respectively indicate the border of half maximum brightness for the section. The overlapping portion between two sections is a cross range shown in the drawings. The greater the cross range is, the severer the cross-talking between the sections will be and the poor the 3D displaying performance will be.

SUMMARY OF THE INVENTION

Thus, an object of the present invention is to provide a backlight module for 3D displaying and an LED light bar thereof, which realize reduction of cross-talking between sections during backlight scanning in order to improve 3D displaying performance.

To achieve the above object, the present invention provides a backlight module for 3D displaying, which comprises a light guide plate and at least one LED light bar. The LED light bar is arranged at one edge of the light guide plate. The LED light bar comprises a plurality of LEDs and a substrate. The LEDs are arranged in a line and are mounted to the substrate in a mutually spaced manner. The LEDs and the substrate of the LED light bar are arranged in a plurality of sections to correspond to a predetermined backlight scanning arrangement, wherein LED spacing set in each of the sections is less than LED spacing set between the section and an adjacent section.

Wherein, one LED light bar is included and the LED light bar is arranged at a short edge of the light guide plate.

Wherein, two LED light bars are included and the two LED light bars are respectively arranged at two opposite short edges of the light guide plate.

Wherein, in each of the sections, the LED spacing is fixed or variable in the section.

Wherein, the LED spacing is smallest at a central area of the section and the LED spacing is gradually increased from the central area toward an end.

Wherein, the substrate comprises a flexible circuit board or a printed circuit board.

The present invention also provides a backlight module for 3D displaying, which comprises a light guide plate and at least one LED light bar, the LED light bar being arranged at one edge of the light guide plate, the LED light bar comprising a plurality of LEDs and a substrate, the LEDs being arranged in a line and mounted to the substrate in a mutually spaced manner, the LEDs and the substrate of the LED light bar being arranged in a plurality of sections to correspond to a predetermined backlight scanning arrangement, wherein LED spacing set in each of the sections is less than LED spacing set between the section and an adjacent section;

wherein two LED light bars are included, the two LED light bars being respectively arranged at two opposite short edges of the light guide plate;

wherein in each of the sections, the LED spacing is fixed or variable in the section;

wherein the LED spacing is smallest at a central area of the section and the LED spacing gradually increased from the central area toward an end; and wherein the substrate comprises a flexible circuit board or a printed circuit board.

The present invention also provides an LED light bar of backlight module for 3D displaying, which comprises a plurality of LEDs and a substrate. The LEDs are arranged in a line and are mounted to the substrate in a mutually spaced manner. The LEDs and the substrate are arranged in a plurality of sections to correspond to a predetermined backlight scanning arrangement, wherein LED spacing set in each of the sections is less than LED spacing set between the section and an adjacent section.

Wherein, in each of the sections, the LED spacing is fixed or variable in the section.

Wherein, the LED spacing is smallest at a central area of the section and the LED spacing gradually increased from the central area toward an end.

Wherein, the substrate comprises a flexible circuit board or a printed circuit board.

The present invention provides a backlight module for 3D displaying, which reduces the cross range between different sections so that cross-talking between different sections is reduced during backlight scanning and the performance of 3D displaying is improved. The present invention provides an LED light bar of backlight module for 3D displaying, which reduces the cross range between different sections so that cross-talking between different sections is reduced during backlight scanning and the performance of 3D displaying is improved.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

Figure 9:
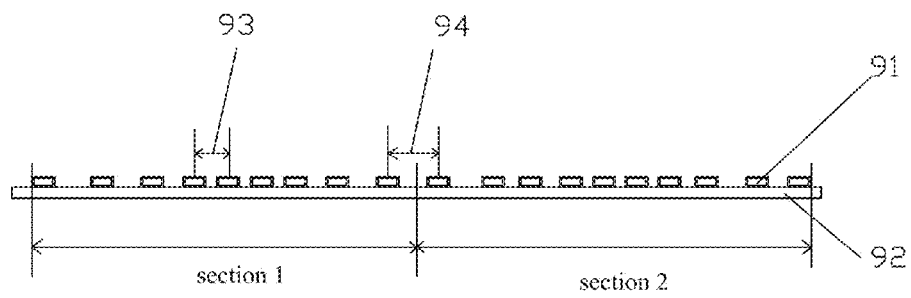
FIG. 9 is a schematic view showing the structure of a preferred embodiment of LED light bar of a backlight module for 3D displaying according to the present invention.

Referring to FIG. 9, which is a schematic view showing the structure of a preferred embodiment of LED light bar of a backlight module for 3D displaying according to the present invention, the LED light bar comprises a plurality of LEDs 91 and a substrate 92. The LEDs 91 are arranged in a line and are mounted to the substrate 92 in a mutually spaced manner. The LEDs 91 and the substrate 92 are arranged in a plurality of sections to correspond to a predetermined backlight scanning arrangement, which in FIG. 9 include section 1 and section 2. The LED spacing 93 set in each of the sections is less than the LED spacing 94 set between the section and an adjacent section. The substrate 92 can be a flexible circuit board or a printed circuit board (PCB).

The present invention provides an arrangement of LEDs on an LED light bar of a backlight module for 3D displaying that is made a specific arrangement according to sectionalization, of which the primary feature is that the LED spacing within a section is less than the LED spacing between sections. The LED spacing within sections can be made identical or different. For example, the LED spacing can be smallest at a central area of a section and LED spacing is gradually increased toward ends of the section. FIG. 9 provides only a schematic illustration (in which only two sections are shown) and the sections of LED in a practical light can be of an arbitrary number.

Figure 10:
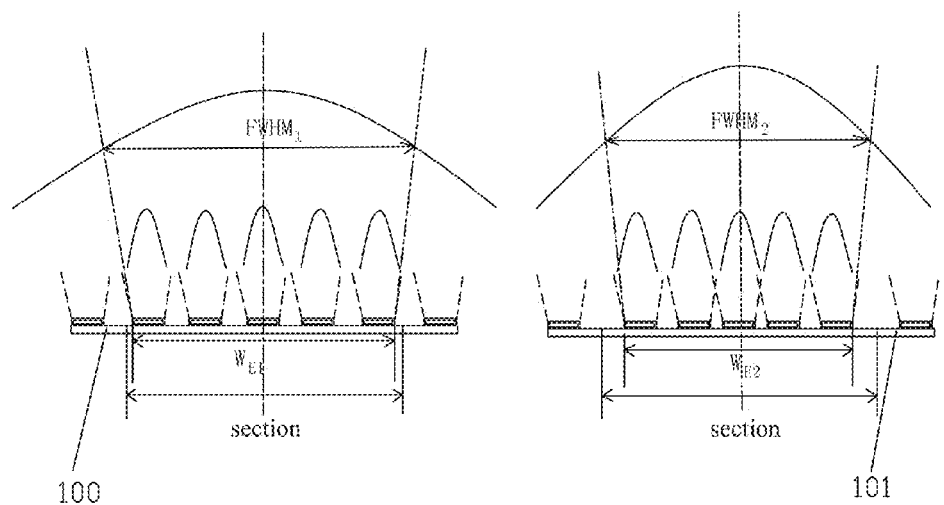
FIG. 10 is a schematic view illustrating difference of light shape distribution between the arrangement of LED in an LED light bar according to the present invention and a conventional LED arrangement.

As shown in FIG. 10, which is a schematic view illustrating difference of light shape distribution between the arrangement of LED in an LED light bar according to the present invention and a conventional LED arrangement, the left hand side LED light bar 100 of FIG. 10 adopts the conventional LED arrangement, while the right hand side shows an LED light bar 101 of a backlight module for 3D displaying that uses the LED arrangement according to the present invention. Comparison between the two arrangements shows the following differences. Although sectionalization of the LED light bars is identical, yet the present invention makes adjustment of LED spacing with respect to the sections to provide different effective emission width $W_E$ for these identical sections. The effective emission width $W_{E2}$ of the LED light bar 101 according to the present invention is less than the effective emission width $W_{E1}$ of the conventional LED arrangement, namely $W_{E2}<W_{E1}$. Since the distribution density of LEDs is different, the overlapping of the LED light fields of the LED light bar 101 according to the present invention shows better convergence as compared to the conventional ones. When compared in respect to FWHM, the LED light bar 101 of the present invention provides $FWHM_2$ that is less than $FWHM_1$ of the conventional arrangement, namely $FWHM_2<FWHM_1$.

Figure 1:
FIG. 1 is a side elevational view of a conventional light guide plate with upper microstructures.
Figure 2:
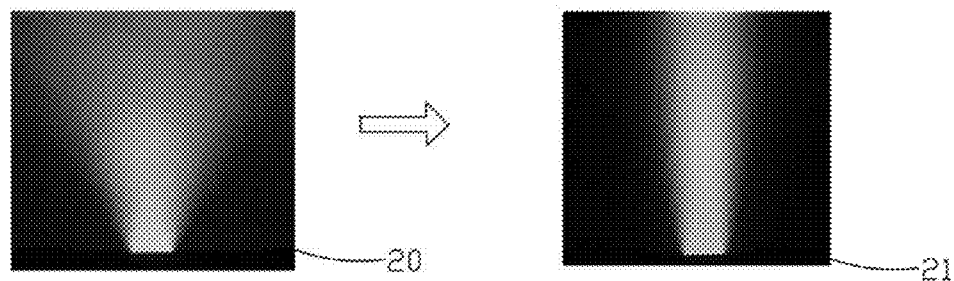
FIG. 2 is a schematic view illustrating difference of light shape between a conventional flat light guide plate and a light guide plate with upper microstructures.
Figure 3:
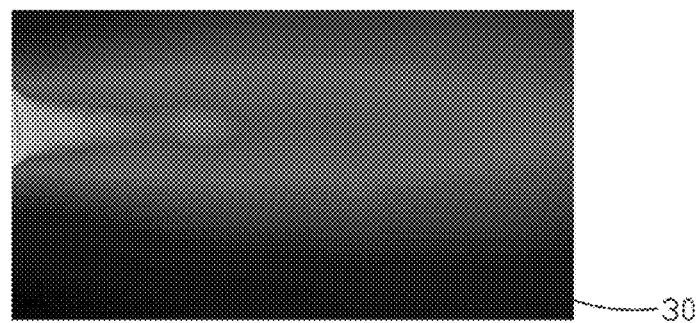
FIG. 3 is a schematic view showing the distribution of light field of a well known upper-microstructured light guide plate for the condition of one section being lit.
Figure 4:
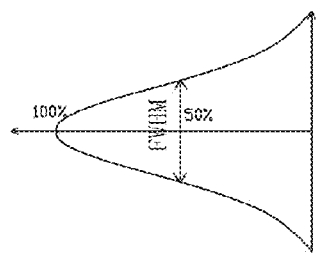
FIG. 4 is a schematic view showing the distribution of brightness in a vertical direction for the light shape shown in FIG. 3.
Figure 5:
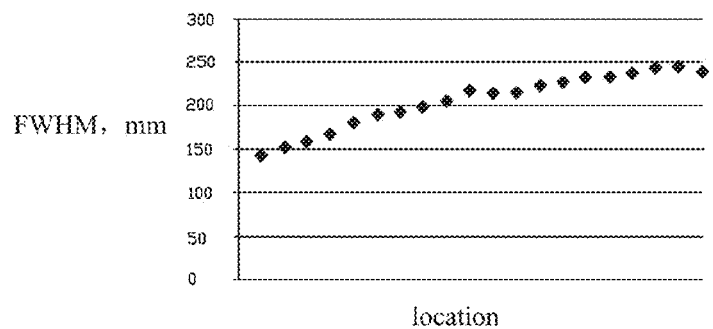
FIG. 5 is a schematic view showing the variation of the width for half brightness at different locations with respect to the distance.
Figure 6:
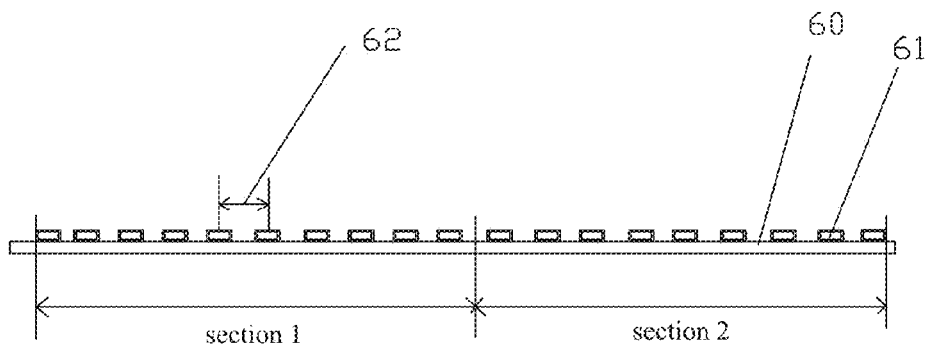
FIG. 6 is a schematic view showing the structure of a conventional side-edge LED light bar.
Figure 7:
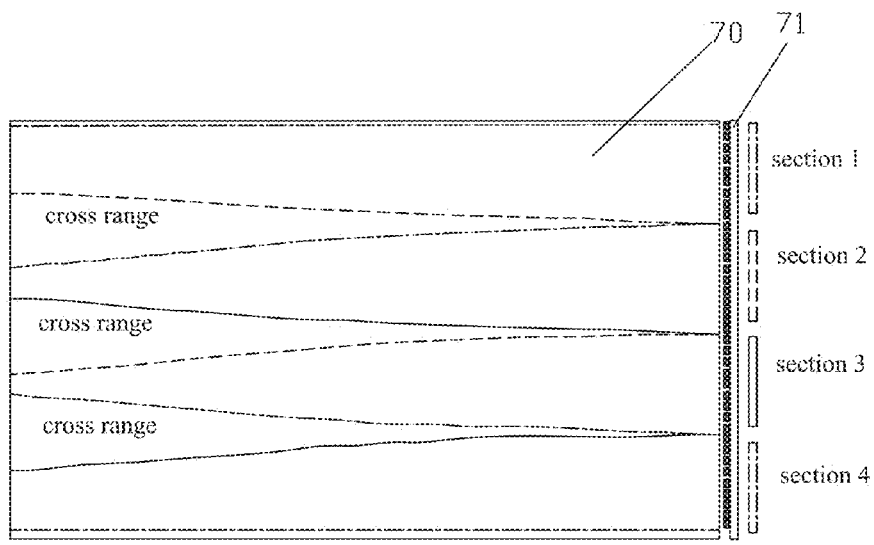
FIG. 7 is a schematic view showing overlapping of backlighting light fields in a conventional backlight module of single short edge incidence.
Figure 11:
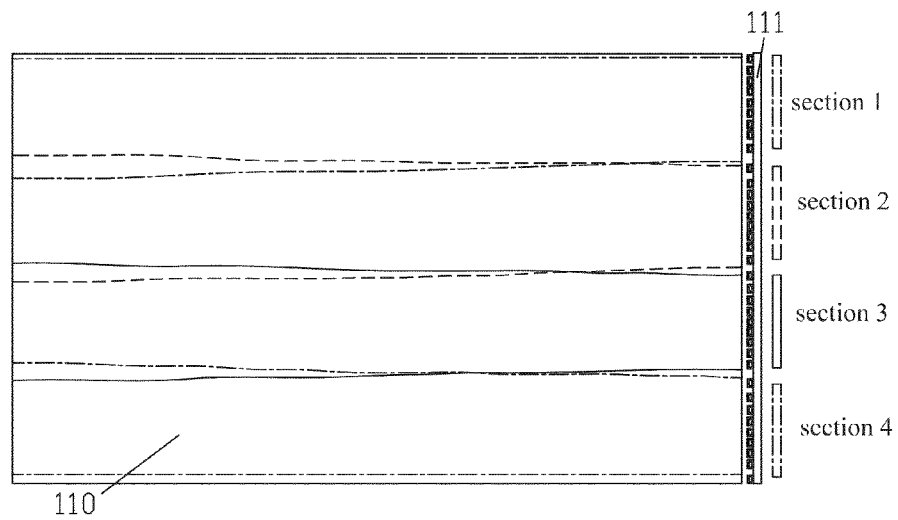
FIG. 11 is a schematic view illustrating overlapping of backlighting light field in a first preferred embodiment of the backlight module for 3D displaying according to the present invention.

Referring to FIG. 11, which is a schematic view illustrating overlapping of backlighting light field in a first preferred embodiment of the backlight module for 3D displaying according to the present invention, in this first preferred embodiment, the backlight module for 3D displaying comprises a light guide plate 110 and an LED light bar 111. The LED light bar 111 is arranged at one short edge of the light guide plate 110 to form a backlight module of singe short edge incidence. The LED light bar 111 adopts the arrangement of the LED light bar for the backlight module for 3D displaying according to the present invention and comprises a plurality of LEDs and a substrate. The LEDs are arranged in a line and are mounted to the substrate in a mutually spaced manner. The LEDs and the substrate of the LED light bar 111 are arranged in four sections to correspond to a predetermined backlight scanning arrangement, wherein the LED spacing set in each of the sections is less than the LED spacing set between the section and an adjacent section. The light field distributions of different light bar sections are respectively indicated by different types of line and in the drawing, these different types of line (a dot-dash line, a dash line, a solid line, and a dot-dash line) respectively indicate the border of half maximum brightness for the section. Compared to the conventional backlight module of singe short edge incidence shown in FIG. 7, the overlapping portion between two sections of the backlight module according to the present invention, namely the cross range, is apparently reduced, whereby cross-talking between sections is reduced and the 3D displaying performance is improved.

Figure 8:
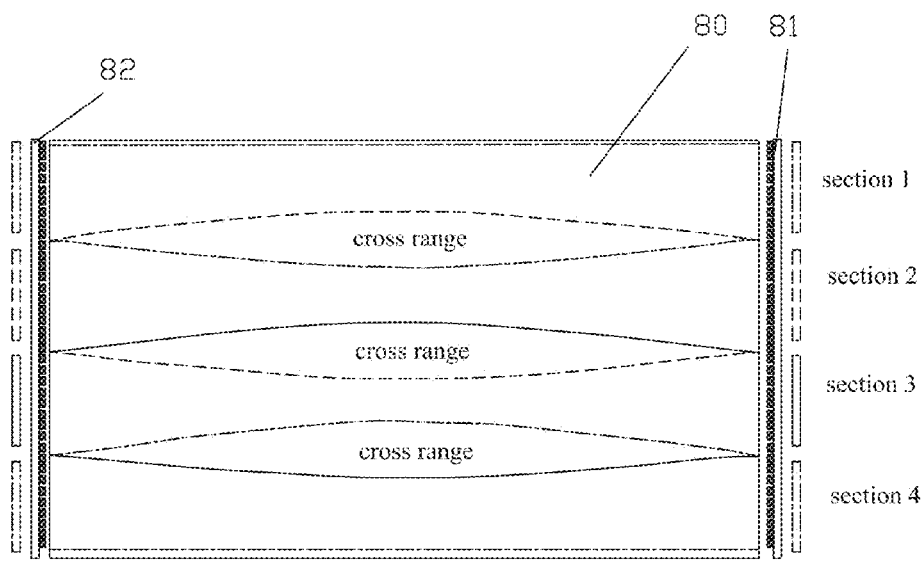
FIG. 8 is a schematic view showing overlapping of backlighting light fields in a conventional backlight module of dual short edge incidence.
Figure 12:
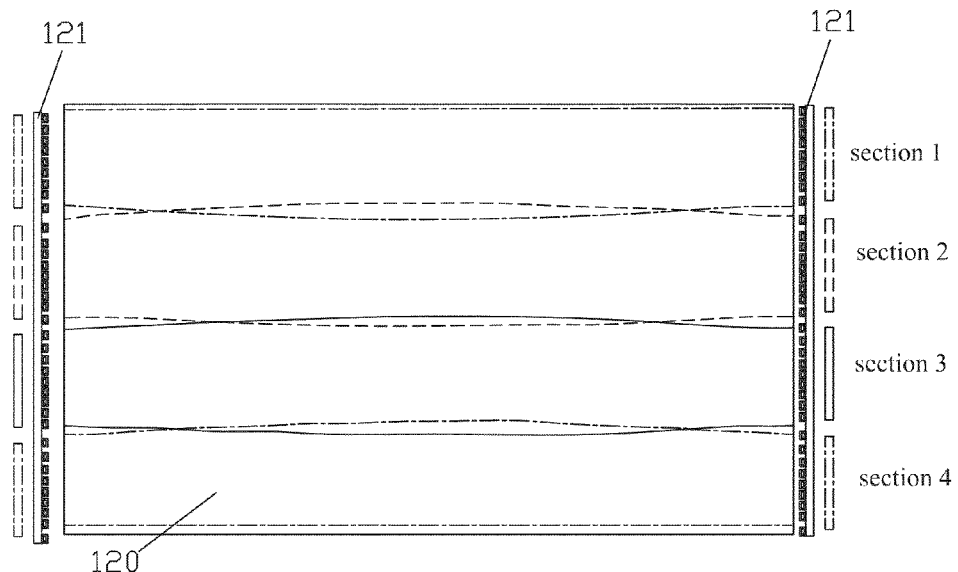
FIG. 12 is a schematic view illustrating overlapping of backlighting light field in a second preferred embodiment of the backlight module for 3D displaying according to the present invention.

Referring to FIG. 12, which is a schematic view illustrating overlapping of backlighting light field in a second preferred embodiment of the backlight module for 3D displaying according to the present invention, in this second preferred embodiment, the backlight module for 3D displaying comprises a light guide plate 120 and two LED light bars 121. The two LED light bar 121 are respectively arranged at two opposite short edges of the light guide plate 120 to form a backlight module of dual short edge incidence. The LED light bard 131 adopt the arrangement of the LED light bar for the backlight module for 3D displaying according to the present invention and is divided into four sections to correspond to a predetermined backlight scanning arrangement, wherein the LED spacing set in each of the sections is less than the LED spacing set between the section and an adjacent section. The light field distributions of different light bar sections are respectively indicated by different types of line and in the drawing, these different types of line (a dot-dash line, a dash line, a solid line, and a dot-dash line) respectively indicate the border of half maximum brightness for the section. Compared to the conventional backlight module of dual short edge incidence shown in FIG. 8, the overlapping portion between two sections of the backlight module according to the present invention, namely the cross range, is apparently reduced, whereby cross-talking between sections is reduced and the 3D displaying performance is improved.

In summary, the present invention provides a backlight module for 3D displaying and LED light bar thereof, which reduce the cross range between different sections so that cross-talking between different section is reduced during backlight scanning and the performance of 3D displaying is improved.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module for 3D (3-dimensional) displaying, comprising a light guide plate and at least one LED (Light Emitting Diode) light bar, the LED light bar being arranged at one edge of the light guide plate, the LED light bar comprising a plurality of LEDs and a substrate, the LEDs being arranged in a line and mounted to the substrate in a mutually spaced manner, the LEDs and the substrate of the LED light bar being arranged in a plurality of sections to correspond to a predetermined backlight scanning arrangement, wherein LED spacing set in each of the sections is less than LED spacing set between the section and an adjacent section.

2. The backlight module for 3D displaying as claimed in claim 1 comprising an LED light bar, the LED light bar being arranged at a short edge of the light guide plate.

3. The backlight module for 3D displaying as claimed in claim 1 comprising two LED light bars, the two LED light bars being respectively arranged at two opposite short edges of the light guide plate.

4. The backlight module for 3D displaying as claimed in claim 1, wherein in each of the sections, the LED spacing is fixed or variable in the section.

5. The backlight module for 3D displaying as claimed in claim 4, wherein the LED spacing is smallest at a central area of the section and the LED spacing is gradually increased from the central area toward an end.

6. The backlight module for 3D displaying as claimed in claim 1, wherein the substrate comprises a flexible circuit board or a printed circuit board.

7. A backlight module for 3D (3-dimensional) displaying, comprising a light guide plate and at least one LED (Light Emitting Diode) light bar, the LED light bar being arranged at one edge of the light guide plate, the LED light bar comprising a plurality of LEDs and a substrate, the LEDs being arranged in a line and mounted to the substrate in a mutually spaced manner, the LEDs and the substrate of the LED light bar being arranged in a plurality of sections to correspond to a predetermined backlight scanning arrangement, wherein LED spacing set in each of the sections is less than LED spacing set between the section and an adjacent section;
   wherein two LED light bars are included, the two LED light bars being respectively arranged at two opposite short edges of the light guide plate;
   wherein in each of the sections, the LED spacing is fixed or variable in the section;
   wherein the LED spacing is smallest at a central area of the section and the LED spacing is gradually increased from the central area toward an end; and
   wherein the substrate comprises a flexible circuit board or a printed circuit board.

8. An LED (Light Emitting Diode) light bar of a backlight module for 3D (3-dimensional) displaying, comprising a plurality of LEDs and a substrate, the LEDs being arranged in a line and mounted to the substrate in a mutually spaced manner, the LEDs and the substrate being arranged in a plurality of sections to correspond to a predetermined backlight scanning arrangement, wherein LED spacing set in each of the sections is less than LED spacing set between the section and an adjacent section.

9. The LED light bar of a backlight module for 3D displaying as claimed in claim 8, wherein in each of the sections, the LED spacing is fixed or variable in the section.

10. The LED light bar of a backlight module for 3D displaying as claimed in claim 8, wherein the LED spacing is smallest at a central area of the section and the LED spacing is gradually increased from the central area toward an end.

11. The LED light bar of a backlight module for 3D displaying as claimed in claim 8, wherein the substrate comprises a flexible circuit board or a printed circuit board.

\* \* \* \* \*